United States Patent [19]

Katzenberger

[11] 4,323,527

[45] Apr. 6, 1982

[54] METHOD FOR MAKING LIGHT WEIGHT CONCRETE BUILDING ELEMENTS

[76] Inventor: Helmut Katzenberger, Archenweg 52, A-6020 Innsbruck, Austria

[21] Appl. No.: 196,094

[22] Filed: Oct. 10, 1980

Related U.S. Application Data

[63] Continuation-in-part of Ser. No. 989, Jan. 4, 1979, abandoned.

[30] Foreign Application Priority Data

Aug. 1, 1978 [AT] Austria ................................ 5567/78

[51] Int. Cl.³ ............................................ B29D 27/00
[52] U.S. Cl. .................................... 264/45.1; 264/51; 264/DIG. 7; 264/DIG. 15
[58] Field of Search ...................... 264/53, 51, DIG. 7, 264/DIG. 15

[56] References Cited

U.S. PATENT DOCUMENTS

| | | | |
|---|---|---|---|
| 2,744,291 | 5/1956 | Stastny et al. | 264/DIG. 15 |
| 2,986,537 | 5/1961 | Chaumeton | 264/DIG. 15 |
| 3,021,291 | 2/1962 | Thiessen | 264/DIG. 7 |
| 3,764,357 | 10/1973 | Bowles et al. | 264/DIG. 7 |

*Primary Examiner*—Philip Anderson
*Attorney, Agent, or Firm*—McGlew and Tuttle

[57] ABSTRACT

A method for making light weight concrete and building elements thereof with an aggregate of foamed expanded plastic beads, e.g. polystyrene. The beads are foamed and let rest before mixing with the other concrete aggregates and forming of the concrete elements but mixing and forming processes take place before a setting of the plastic beads due to aging has taken place.

4 Claims, No Drawings

METHOD FOR MAKING LIGHT WEIGHT CONCRETE BUILDING ELEMENTS

This is a continuation-in-part of U.S. application Ser. No. 989 filed Jan. 4, 1979, now abandoned.

BACKGROUND OF THE INVENTION

The invention refers to a method for making construction elements of light weight concrete with a binder, e.g. cement, inorganic aggregates, e.g. sand, and an aggregate of expanded foamed beads, for example polystyrene expanded beads, whereby the granules are foamed before the mixing process after which the ready concrete mix is inserted into a form for compaction.

Light weight construction elements such as gladding panels, concrete blocks and so on produced according to such a method show very attractive heat insulating properties and in many cases provide excellent sound absorption. A further noticeable advantage is the ease of handling due to reduced weight in comparison to construction elements made of normal weight concrete.

According to the prior art, plastic beads are foamed in an expanding apparatus and after aging and a certain time of storage are fed into a concrete mixer together with the other aggregates. The ready mix is then formed in ground laying machines, stationary machines or the like used for the production of standard concrete elements.

The problems that occur in such production include extremely long compaction time and a tendency of the elements to burst so that the percentage of waste goods is high.

As the inventor recognized this shortcomings are due to the fact that the foamed and fully aged plastic beads have a certain elasticity so that they are compressed during the compaction of the concrete mix and tend to reexpand after the compaction pressure dissipates. If, at that time, the binder e.g. cement has not hardened sufficiently the result is that the block cracks.

Other methods provide a pre foaming of the plastic beads and, after the aging step a final reheating step with steam in the mould. This necessitates special expensive moulds. Alternatively when the treatment occurs immediately before the mix enters the mould, an additional working step is required.

Also, in the second case, expansion of the plastic beads takes place in the mould with the resulting disadvantages as the necessity of a long holding time in the mould for the produced elements.

SUMMARY OF THE INVENTION

It is therefore an object of the invention to provide a method for producing a reasonable quantity of concrete building elements, especially concrete blocks, of light weight polystyrene concrete whereby the scrap ratio is extremely reduced.

It is a further object of the invention to provide a method for making a polystyrene light weight concrete mix allowing the use of a conventional concrete mixer but still resulting in a concrete mix that allows rapid and economical production of concrete building elements with a very small scrap ratio.

According to the invention, this is achieved by the following steps:

foaming expandable polymere beads using staturated steam for a period of 2 minutes to 10 minutes, preferably 1.5 minutes–2.5 minutes, exposing the foamed beads to air under atmospheric conditions for a period between 0.5 minutes and 15 minutes, preferably between 1 minute and 8 minutes, then mixing these beads with a cementitious mixture including a binding agent, inorganic aggregates and water; for a period of 0.5 minutes to 10 min preferably 1.5 minutes–2.5 minutes, placing the mixture thus formed, within 45 minutes preferably within 15 minutes, into a mold and applying pressure thereto momentarily; and releasing the mixture from the mold to form a light weight concrete building element whereby the foamed beads are irreversibly compressed in the mold and to not expand once the pressure applied to the mold is released to destroy the light weight cement building element before the binding agent has set.

Compacting is accomplished in a mould, e.g., with a press die.

The pressure in the mould must not be maintained till final setting of the binding agent.

This means that the concrete mix is compacted at a time when the plastic beads are not yet stabilized but in a plastic state the foamed and expanded beads are deformable by outer pressure without the occurrence of counter pressure due to elasticity of the fully aged plastic beads.

It is advantageous to compact the concrete mix when the degree of firmness of the plastic beads is at least near the flow limit, e.g. when the plastic beads are soft and deformable but do not react elastically. This is within about 55 min of the time the beads are first formed. After this time the plastic sets.

An advantageous embodiment of the method provides that the foamed plastic beads are deposited into a transmission chamber for resting and are brought into the concrete mixer from the transmission chamber in doses.

Preferably, three units or mixture doses of plastic beads are foamed in an expanding apparatus with heat by steam and at least two units are brought into the transmission chamber while one unit is deposited in the concrete mixer. The first mixing cycle starts 4 minutes after the foaming has ended and the beads that are brought to the chamber stay there for 6 minutes to 10 minutes before being mixed with the other aggregates. After termination of the first mixing cycle half of the plastic beads in the transmission chamber are brought into the mixer and mixed with the other concrete aggregates whereafter termination of this second mixing cycle the rest of the beads in the transmission chamber is brought into the mixer for a third concrete mixing cycle.

It is advantageous when the plastic beads stay maximally ten minutes in the transmission chamber.

DETAILED DESCRIPTION

In the following a preferred enbodiment of a method according to the invention is described.

Expandable plastic beads BP Montopore standard FP 71 2069 436 with pentane as are inflating agent (Manufacturer British Petrol) are foamed for 2 minutes to obtain a bulk weight of about 12.5 g per liter.

Foaming is done with steam of a pressure of 0.5 to 0.6 bar, at a temperature of the steam of 103°–105° C. and lasts 2 min. After that the beads are exposed to rest 4 minutes under atmospheric conditions.

After resting thereafter, the beads are brought into a mixer and the following ingredients are mixed:

| | |
|---|---|
| Cement, Portland | 361 kg per m³ concrete |
| Water | 116 kg/m³ concrete |
| Sand | 0–3 mm mesh/722 kg per m³ concrete |
| Plastic beads | 12 kg/m³ concrete |
| Plastifier | 1 kg/m³ concrete |

Mixing time is 2 min.

The concrete is formed to solid blocks of 44 cm × 21.5 cm × 10 cm within 15 min after mixing. After 28 days the crusling strength of the blocks was 2.4 newton per mm².

In an other embodiment involving three mixing cycles for one foaming cycle.

The first mixing cycle starts 4 minutes after the foaming has ended and the beads that are brought to the chamber stay there for 6 to 10 min before being mixed with the other aggregates.

27 kg plastic beads, e.g. polystyrene beads, are foamed in an expander apparatus by means of saturated steam at a pressure of approximately 1.3 bar for 5.4 minutes. The beads can be foamed at a pressure of between about 1 to 2 bar and the process of expansion takes from about 3 to 10 min. It is to be kept in mind that the reaction of the beads continues after the foaming has stopped. The beads exposed to air, will age and set, and after at least 55 minutes have an elastic coating. Before this time, they can be used in the invention.

Two cubic meters of expanded plastic beads is obtained. From 0.65 m³ up to 0.75 m³ foamed plastic beads are introduced into a concrete mixer for mixing with the other aggregates such as cement, water and sand after 4 min. The rest of the plastic granulate remains in the transmission chamber.

Mixing time is about 1.8 minutes. Thereafter, the mixture is discharge and, half of the remaining beads of the transmission chamber are brought into the mixer for the second mixing cycle. Subsequently, a third mixing cycle is performed with the rest of the plastic beads. The amount of light weight concrete produced in all three mixing cycles together is approximately 2.0 m³. The third mixing cycle is finished 12 min after the foaming of the beads was finished.

The mix is fed into a pressure mold for compaction within 15 min after foaming of the beads with 380 kg cement in 520 liters sand and 11 to 14 kg foamed plastic beads, a concrete block is made with a hardness of 1100 kp/cm³.

What is claimed is:

1. A method of making light weight concrete building elements comprising the steps of:
    foaming expandable polymer beads using saturated steam for a period of about 2 minutes to 10 minutes, preferably 1.5 minutes to 2.5 minutes, exposing the foamed beads to air under atmospheric conditions for a period between 0.5 minutes and 15 minutes, preferably between 2 and 8 minutes,
    then mixing the beads with a cementitious mixture including a binding agent, inorganic aggregates and water for a period of 0.5 minutes to 10 minutes, preferably 1.5 minutes to 2.5 minutes, and
    placing the mixture thus formed within 45 minutes, preferably within 15 minutes, into a mold and applying pressure thereto momentarily; and then releasing the mixture from the mold to form a light weight concrete building element whereby the foamed beads are irreversibly compressed in the mold so as to not expand once the pressure applied to the mold is released to destroy the light weight concrete building element before the binding agent has set.

2. A method according to claim 1, wherein said beads are foamed under pressure, said pressure being about 1.3 bar.

3. The method according to claim 1 or 2, wherein said beads comprise the material polystyrene.

4. A method according to claim 3, wherein said binding agent is cement and said inorganic aggregate includes sand.

* * * * *